United States Patent [19]

Vickers

[11] Patent Number: 5,284,996
[45] Date of Patent: Feb. 8, 1994

[54] WASTE GAS STORAGE

[75] Inventor: Brian D. Vickers, Huntington Beach, Calif.

[73] Assignee: McDonnell Douglas Corporation, Long Beach, Calif.

[21] Appl. No.: 843,593

[22] Filed: Feb. 28, 1992

[51] Int. Cl.$^5$ .............................................. B09B 3/00
[52] U.S. Cl. .................. 588/249; 220/590; 405/52; 405/128
[58] Field of Search ............. 405/52, 128; 588/249; 220/590, 592, 591

[56] References Cited

U.S. PATENT DOCUMENTS

| | | | |
|---|---|---|---|
| 2,822,825 | 2/1958 | Enderlein et al. | 220/592 X |
| 3,240,644 | 3/1966 | Wolff | 220/590 X |
| 3,307,730 | 3/1967 | Davidson | 220/592 X |
| 3,765,557 | 10/1973 | Giwer | 220/590 |
| 3,925,132 | 12/1975 | Bartlow et al. | 220/592 X |
| 3,969,812 | 7/1976 | Beck | 220/414 X |
| 3,994,431 | 11/1976 | Steiner | 220/414 X |
| 4,053,080 | 10/1977 | Daublebsky | 220/592 X |
| 4,225,051 | 9/1980 | Faudou et al. | 220/590 |

FOREIGN PATENT DOCUMENTS

| | | | |
|---|---|---|---|
| 2031815 | 11/1970 | France | 220/592 |
| 919174 | 2/1963 | United Kingdom | 220/592 |

*Primary Examiner*—Dennis L. Taylor
*Attorney, Agent, or Firm*—Max Geldin

[57] ABSTRACT

Method for storing a waste gas mixture comprised of nitrogen, oxygen, carbon dioxide, and inert gases, the gas mixture containing corrosive contaminants including inorganic acids and bases and organic solvents, and derived from space station operations. The gas mixture is stored under pressure in a vessel formed of a filament wound composite overwrap on a metal liner, the metal liner being pre-stressed in compression by the overwrap, thereby avoiding any tensile stress in the liner, and preventing stress corrosion cracking of the liner during gas mixture storage.

12 Claims, 1 Drawing Sheet

WASTE GAS STORAGE

The invention described herein was made in the performance of work under NASA contract No. NAS-9-18200 and is subject to the provisions of Section 305 of the National Aeronautics and Space Ace of 1958 (42 U.S.C. 2457).

BACKGROUND OF THE INVENTION

This invention relates to high pressure storage of waste gas produced in operation of a space vehicle such as a space station, and is particularly concerned with procedure for avoiding stress corrosion cracking of metal containers employed for storing pressurized waste gas containing corrosive contaminants.

In space station systems different laboratory modules on the space station are designed for carrying out a variety of experiments, and generate a mixed waste gas composed primarily of nitrogen, carbon dioxide, oxygen and inert gases. The mixed waste gas will also contain a wide variety of trace contaminant vapors and particles including organic and inorganic acids and bases and organic solvents, and halogens, generated from the experiments performed in the laboratory modules on the space station. Such waste gas can be removed, stored and propulsively vented through resistojets as part of a supplemental reboost propellant system for the space station. Thus, a substantial amount of primary reboost propellant is saved by using waste gases for supplemental reboost.

In the mixed waste gas system which is directly connected to the space station, the mixed waste gas is stored at high pressures of about 1000 to about 1100 psi. Such high pressure storage of mixed waste gases containing an uncertain mixture of chemical contaminants has caused grave concerns in regard to material reliability, corrosion and particularly stress corrosion cracking of metal storage containers and hardware, in the high pressure areas of the system.

Concentrations and mixtures of gases and contaminants will constantly change over the long period, e.g. 30 year, operation of the space station. Such a gas environment renders it very difficult to characterize material behavior with respect to corrosion and stress corrosion cracking resistance. To applicant's knowledge, no engineering metal that is compatible with all potential contaminants of the waste gas mixture is presently available, and there is potential danger of an unexpected, catastrophic failure of an all metal pressure vessel caused by stress corrosion cracking resulting from an unpredictable waste gas/contaminant environment. Because of such stress corrosion cracking concerns, an alternative to the all-metal pressure vessel for high pressure waste gas storage is required.

Composite pressure vessels with metal liners operating in compression are known. Thus, U.S. Pat. No. 3,969,812 discloses a method of producing an overwrapped composite pressure vessel which induces a compressive prestress into a metal liner by pressurizing the vessel beyond the elastic limit of the liner after overwrapping the liner, elastically unloading the liner by reducing the pressure, and compressing the liner with the filament overwrap. U.S. Pat. No. 3,240,644 is also exemplary of a method of making pressure vessels formed by winding layers of resin coated filaments on a metal shell, curing the resin and subjecting the interior of the shell to fluid pressure to expand the shell so as to establish a pre-stress in the cylindrical wall section.

It is an object of the present invention to provide a method for storing waste gases in a pressure vessel having a metal liner so as to provide stress corrosion cracking resistance of the liner.

Another object is to provide procedure for storing pressurized waste gas containing contaminants from a space station in a pressure vessel having a metal liner, over extended periods of storage while preventing stress corrosion cracking of the metal liner and avoiding the danger of catastrophic failure of the pressure vessel.

A still further object of the invention is the provision of an effective method for storing gas mixtures containing corrosive contaminants in pressure vessels other than all-metal pressure vessels under conditions to prevent stress corrosion cracking and the danger of catastrophic failure of an all-metal pressure vessel.

Other objects and advantages will appear hereinafter.

SUMMARY OF THE INVENTION

The objects of the invention can be achieved and stress corrosion cracking of metal pressure vessels in the presence of gas mixtures containing corrosive contaminants prevented by employing a composite pressure vessel for gas storage that will always be compressively stressed during operation. The gas mixture is stored in a container formed of a metal liner and a composite overwrap, the composite overwrap being stressed in tension and the metal liner being stressed in compression. In the production of such a pressure vessel, sufficient composite, e.g. in the form of fiber reinforced resin such as graphite-epoxy composite, is overwrapped on the metal liner such that after curing of the resin and pressurization of the pressure vessel, the resulting elastically strained composite will drive the plastically-strained metal liner into a compressive stress state. The design of the pressure vessel is such that during operation, at maximum operating pressure, the metal liner remains compressed by the composite.

A pressure vessel having the above characteristics and suitable for high pressure storage of gas mixtures according to the invention is that disclosed in above U.S. Pat. No. 3,969,812. To applicant's knowledge, however, the application of composite pressure vessels with compressively stressed metal liners to avoid or substantially reduce the danger of stress corrosion cracking thereof is a novel concept for the lightweight and safe storage of mixed contaminated waste gases in space.

The advantage of the present invention over the conventional use of all-metal pressure vessels is that the liner of the overwrapped composite pressure vessel hereof is essentially stress corrosion cracking immune, in that there is no tensile stress in the metal liner to promote crack growth in a stress corrosive environment.

DETAILED DESCRIPTION OF THE INVENTION AND PREFERRED EMBODIMENTS

Figure 1:
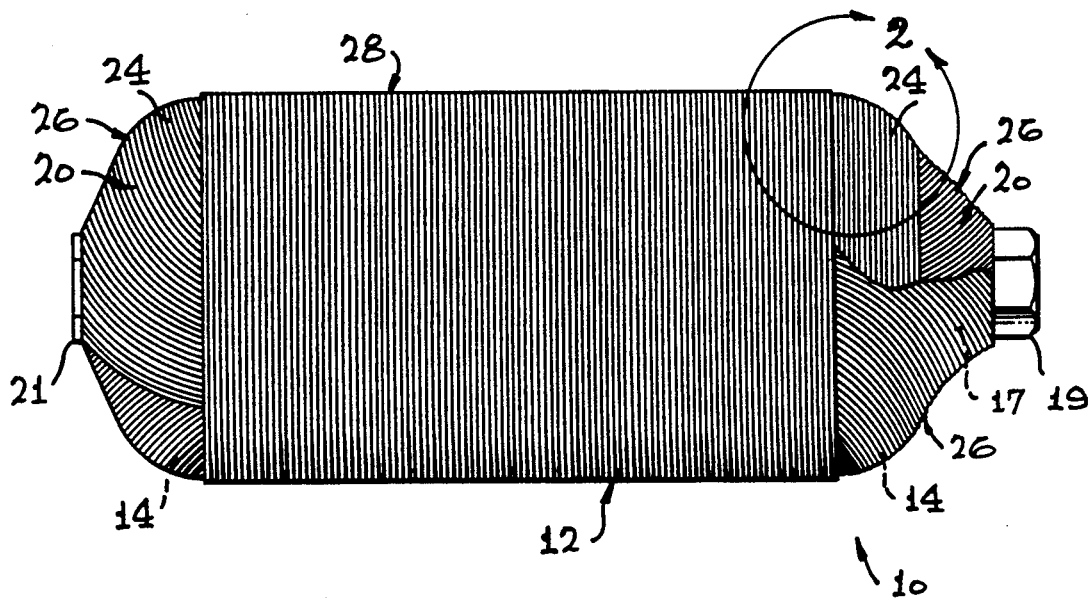

The waste gas mixture for which the invention concept is particularly applicable, and which is discharged from the experiment modules of a space station, generally comprises nitrogen, oxygen, carbon dioxide and inert gases such as argon, helium, krypton and xenon. Such gas mixture can also include some air.

Contaminants present in the waste gas mixture can include inorganic acids and bases such as HCl, $H_2SO_4$, $NH_3$, $NH_4OH$, as well as organic acids and bases such as oxalic acid, acetic acid, ethylene glycol and phenol. Other contaminants generally can include organic solvents such as alcohols, e.g. isopropyl alcohol and methanol, ketones such as methylethyl ketone and acetone, ethers, esters, hydrocarbons and halogenated hydrocarbons such as ethane, trichloroethylene, carbon tetrachloride, and Freon, a trademark of DuPont for a line of fluorocarbons. Other contaminants which can be present are HCN, $H_2S$, $SO_2$ and halogens such as $Cl_2$. Such contaminants are generally present in vapor form in the waste gas mixture. Inorganic and organic particulate materials in powder or solid form can also be present. The level of concentration of contaminants in the waste gas mixture can range from as low as 5 ppm (parts per million) to stress corrosion environments as high as 5% by weight of the gas mixture.

The waste gas mixture is generally compressed to a pressure ranging from about 100 to about 3000 psi, e.g. about 1000 psi, and is discharged into and stored in a pressure vessel according to the invention. Such pressure vessel is a container formed of a metal liner and a composite overwrap, the composite overwrap being stressed in tension and the metal liner being stressed in compression during operation to provide stress corrosion cracking resistance throughout storage of the waste gas mixture. A preferred metal liner for storing waste gases containing contaminants according to the invention and from a general corrosion standpoint is composed of a nickel alloy such as Inconel 718 or Inconel 625. However, depending on the particular composition of the waste gases and contaminants therein other metal liners can be employed such as stainless steel, e.g. 316L or 304L stainless steel, or aluminum alloys such as 6061-T6.

The composite materials employed as overwrap on the metal liner can be those typically employed in state of the art composite pressure vessels and which achieve the desired compressive stress state of the metal liner. For this purpose, filament wound resin composite materials employed are those suitable for withstanding high fluid pressures. The filament used can be graphite, Kevlar, which is poly(paraphenylterephthalamide), glass and boron fibers. The resin employed can be any suitable resin having high strength, such as epoxy, polyether and polyether ether ketone (PEEK), and are usually thermoset-based resins.

Composite pressure vessels with a compressively stressed metal liner for mixed compressed waste gas storage according to the invention can be produced according to the method of above U.S. Pat. No. 3,969,812. The force balance between the liner prestressed in compression and its overwrap prestressed in tension is obtained before the vessel is placed into service. According to the method of the patent, after formation of the liner to the desired shape of the vessel, the filament winding operation is performed. The filament employed is drawn through a resin filled reservoir to resin coat the filament before it is wrapped. The filament is then wrapped in a plurality of layers around the liner, which can be generally of cylindrical shape and which can be closed at opposite ends as by a bottom and neck portion.

After the vessel has been overwrapped with the filament wound resin composite, heat curing of such overwrap is carried out. The heat curing step can be carried out at temperatures ranging from about 250 to about 350° F. depending on the particular resin employed.

After the vessel has been overwrapped and heat cured, a sizing pressurization step is performed. This is accomplished by increasing the pressure in the vessel to a pressure exceeding the yield strength of the metallic liner and then reducing the vessel pressure to ambient.

During this cycle, when the pressure exceeds the yield strength of the metallic liner, the liner will deform plastically outwardly and tend to retain the enlarged configuration to which the liner was plastically deformed. However, the elastic limit of the filament overwrap will not be exceeded during the pressurization and plastic deformation of the liner. Due to the plastic deformation of the liner, when the liner has elastically unloaded, the filament overwrap is still in tension. Therefore, the filament overwrap applies generally inwardly directed forces to the outer surface of the liner when it reaches the elastically unloaded condition. These outwardly directed overwrap forces are effective to compress and elastically deform the liner. However, they are of insufficient magnitude to plastically deform the liner in compression. Therefore, after the sizing pressurization cycle the overwrap filament is stressed in residual tension and the liner is stressed in residual compression.

The above method for producing a composite pressure vessel with a compressively stressed metal liner is described in detail in U.S. Pat. No. 3,969,812, and forms no part of the present invention.

Figure 2:
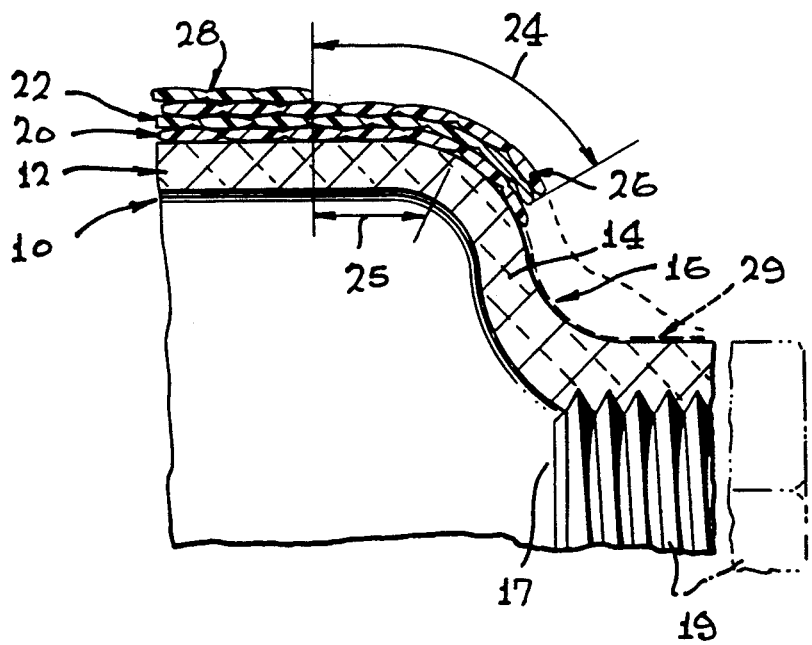

For greater clarity, FIGS. 1 and 2 of the drawing illustrate a composite pressure vessel having a compressively stressed metal liner produced according to U.S. Pat. No. 3,969,812, and which can be employed in the present invention, wherein FIG. 1 is a composite view of a completely overwrapped pressure vessel, and FIG. 2 is a cross-sectional view taken on line 2 of FIG. 1.

As shown in FIGS. 1 and 2 liner 10 includes a cylindrical portion 12 and a pair of hemispherically shaped dome portions 14 at each end of the cylindrical portion. At least one dome portion 14 includes a neck portion 16 containing a fluid port 17 and the other end is suitably contoured as at 21, but does not contain a fluid port. Stopper means such as 19 is provided to seal fluid port 17.

As shown in FIGS. 1 and 2, the overwrap material pattern includes a polar oriented filament overwrap 20 which covers the entire surface of the inner and which is in engagement therewith. Cylindrically oriented filament ovewrap 22 overlies the polar overwrap 20 and, as show in FIGS. 1 and 2, includes a portion 24 which covers the junction of the cylindrical portion of the liner and the dome portion of the liner (the area of the liner designated 25) and extends over part of the dome portion 14.

A second polar filament overwrap 26 is shown covering the first cylindrical overwrap 22 and has the effect of holding the cylindrical overwrap 22 against movement relative to the liner. The portion of the overwrap material near the neck of the vessel is defined in broken lines at 29. The final step involves the application of the top cylindrical filament overwrapping material against the liner. As particularly depicted in FIGS. 1 and 2 the top cylindrical overwrap 28 does not extend over the junction between the cylindrical portion and either dome portion.

As previously noted, the waste gas mixture containing contaminants according to the invention is stored at high pressure, e.g. at about 1100 psi, and at temperature which can range from about 200 to about 300° F., depending upon the cure temperature of the particular resin employed in the overwrap. Thus, for an overwrap resin having a 250° F. cure, temperature of the gas mixture storage should not exceed about 200° F. For an overwrap resin having a higher cure temperature such as a 350° F. cure, temperature of the gas in storage should not exceed about 300° F.

A typical mixed waste gas mixture which can be stored under pressure in a composite pressure vessel with a compressively stressed metal liner according to the invention can have the following composition:

|  | Weight Percent |
|---|---|
| Nitrogen | 42.4 |
| Argon | 31.4 |
| Air | 14.3 |
| Oxygen | 4.7 |
| Krypton | 3.1 |
| Carbon Dioxide | 1.3 |
| Xenon | 1.0 |
| Helium | 0.5 |
| Freon | 0.5 |
| Trace contaminants* | 1.9 |

*including HCl, $H_2SO_4$, $NH_3$, $NH_4OH$, isopropyl alcohol, methanol, methyl ethyl ketone, trichloroethylene The above waste gas mixture is compressed and stored in a graphite fiber-epoxy composite overwrap pressure vessel having a compressively stressed Inconel 718 metal liner at 1100 psi pressure and at temperature of 200° F., over an extended time period of months or longer safely and without stress corrosion cracking of the metal liner during the period of storage.

It will be understood that gas mixtures other than a waste gas mixture containing contaminants from a space station can be stored under pressure in a composite pressure vessel with a compressively stressed metal liner to safely store such gases by preventing stress corrosion cracking in the liner.

From the foregoing, it is seen that the invention provides a method which is particularly designed for storage of waste gas containing contaminants, by introducing such gases into a filament wound composite pressure vessel containing a liner which has good corrosion resistance to the gas mixture contaminants and is compressively stressed by the composite overwrap to provide enhanced stress corrosion cracking resistance to the liner and afford safe lightweight gas storage for the mixed waste gases in a lightweight container in space. The liner remains in its compressed state during operation at the maximum operating pressure. Since the metal liner is under compression during operation, there is no tensile stress present in the metal liner to promote crack growth in a stress corrosive environment.

Since various further modifications of the invention will occur to those skilled in the art, the invention is not to be taken as limited except by the scope of the appended claims.

What is claimed is:

1. In a method for storing a gas mixture under pressure in a metal container, said gas mixture containing corrosive contaminants, said metal container being subject to stress corrosion cracking in the presence of said contaminant-containing waste gas mixture when said metal container is under substance tensile stresses generated by said pressurized gas mixture, the improvement which comprises passing said pressurized gas mixture into a container formed of a metal liner and a composite overwrap, and storing said pressurized gas mixture in said container, said composite overwrap being stressed in tension and said metal liner being stressed in compression, thereby eliminating said tensile stresses and preventing stress corrosion cracking of said liner during storage of said pressurized gas mixture in said container.

2. The method as defined in claim 1, said gas mixture being a mixed waste gas mixture comprising nitrogen, oxygen, carbon dioxide and inert gases.

3. The method as defined in claim 1, said contaminants including organic and inorganic acids and bases, and organic solvents.

4. The method as defined in claim 1, said gas pressure ranging from about 100 to about 3000 psi.

5. The method as defined in claim 1, the temperature of said gas mixture ranging from about 200 to about 300° F.

6. A process for storing a gas mixture under pressure, said gas mixture containing corrosive contaminants including organic and inorganic acids and bases, and organic solvents, which comprises introducing said gas mixture into a container having a metal liner and a fiber reinforced resin overwrap, and storing said gas mixture in said container, said fiber reinforced overwrap being stressed in tension and said liner being compressed by said overwrap, thereby aiding in preventing stress corrosion cracking of said liner by said gas mixture during storage thereof.

7. The process of claim 6, said gas mixture being a mixed waste gas mixture comprising nitrogen, oxygen, carbon dioxide and inert gases.

8. The process as defined in claim 6, said gas pressure ranging from about 100 to about 3000 psi., the temperature of said gas mixture ranging from about 200 to about 300° F.

9. The combination, a container formed of a metal liner and a composite overwrap, and a pressurized gas mixture containing corrosive contaminants in said container, said composite overwrap being stressed in tension and said metal liner being stressed in compression, thereby eliminating tensile stresses in said metal liner and preventing stress corrosion cracking thereof by said corrosive contaminants.

10. The combination as defined in claim 9, said gas mixture being a mixed waste gas mixture comprising nitrogen, oxygen, carbon dioxide and inert gases, and said contaminants including organic and inorganic acids and bases, and organic solvents.

11. The combination as defined in claim 9, said metal liner selected from the group consisting of a nickel alloy, stainless steel and an aluminum alloy, and said composite overwrap being a filament wound resin composite.

12. The combination as defined in claim 11, wherein said filament is selected from the group consisting of graphite, poly(paraphenylterephthalamide), glass and boron fibers, and said resin is selected from the group consisting of epoxy, polyether and polyether ether ketone.

* * * * *